United States Patent
Schueler et al.

(10) Patent No.: US 7,305,872 B2
(45) Date of Patent: Dec. 11, 2007

(54) METHOD FOR OPERATING AN INTERNAL COMBUSTION ENGINE

(75) Inventors: Matthias Schueler, Steinheim (DE); Christian Mader, Gerlingen (DE); Mohamed Youssef, Nuefringen (DE); Christian Hugel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 11/498,396

(22) Filed: Aug. 2, 2006

(65) Prior Publication Data

US 2007/0033997 A1    Feb. 15, 2007

(30) Foreign Application Priority Data

Aug. 4, 2005 (DE) .................. 10 2005 036 727

(51) Int. Cl.
 *G01M 15/00* (2006.01)
(52) U.S. Cl. .................. 73/117.3; 73/35.09
(58) Field of Classification Search ............. 73/35.01, 73/35.03, 35.06, 35.07, 35.09, 35.11, 35.12, 73/35.13, 116, 117.2, 117.3, 118.1
See application file for complete search history.

(56) References Cited

U.S. PATENT DOCUMENTS

| | | | |
|---|---|---|---|
| 7,257,479 B2 * | 8/2007 | Damitz et al. ............. 701/105 |
| 7,260,469 B2 * | 8/2007 | Birk et al. ............. 701/111 |
| 7,269,498 B2 * | 9/2007 | Damitz et al. ............. 701/111 |
| 2005/0145214 A1 * | 7/2005 | Damitz et al. ............. 123/299 |
| 2006/0064230 A1 * | 3/2006 | Damitz et al. ............. 701/105 |
| 2006/0085119 A1 * | 4/2006 | Damitz et al. ............. 701/111 |
| 2006/0122766 A1 * | 6/2006 | Schueler ............. 701/114 |
| 2007/0050124 A1 * | 3/2007 | Birk et al. ............. 701/111 |

FOREIGN PATENT DOCUMENTS

DE    198 45 232    4/2000

* cited by examiner

*Primary Examiner*—Eric S. McCall
(74) *Attorney, Agent, or Firm*—Kenyon & Kenyon LLP

(57) ABSTRACT

In an internal combustion engine, a structure-borne noise generated in a combustion chamber is detected by a structure-borne noise sensor. A quantity is ascertained on the basis of the structure-borne noise signal. A reference quantity of an undrifted structure-borne noise sensor is ascertained for a certain reference operating state for the combustion chamber, during continuous operation of the engine the quantity is ascertained for the reference operating state, and from a change over time of the ascertained quantity with respect to the reference quantity, a drift of the structure-borne noise sensor is ascertained.

11 Claims, 5 Drawing Sheets

METHOD FOR OPERATING AN INTERNAL COMBUSTION ENGINE

FIELD OF THE INVENTION

The present invention relates to a method for operating an internal combustion engine in which a structure-borne noise generated by a pressure change in a combustion chamber is detected by a structure-borne noise sensor and a quantity is ascertained on the basis of the structure-borne noise signal.

BACKGROUND INFORMATION

The use of signals of one or more structure-borne noise sensors for analyzing the combustion process in the combustion chambers of an internal combustion engine is described, for example, in German Patent Application No. DE 198 45 232. These structure-borne noise sensors have the advantage compared to a direct pressure measurement in the combustion chambers using pressure sensors that they are considerably less expensive and their installation is relatively simple. The pressure variation in the combustion chambers is recognizable mainly by an analysis of the low-frequency component of the structure-borne noise signal. This low-frequency component is in turn caused by the deformation of the engine block resulting from the compression in the combustion chamber. The signal of such structure-borne noise sensors is, however, often subject to considerable drift over a longer time.

An object of the present invention is to reliably recognize such a drift of the structure-borne noise sensor during operation of the engine.

SUMMARY OF THE INVENTION

The drift of a structure-borne noise sensor may be recognized and quantified over its lifetime using the method of the present invention, which allows the quality of the signal provided by the structure-borne noise sensor to be reliably analyzed. For example, when the drift exceeds a limiting value, an entry may be made in an error memory, so that the corresponding structure-borne noise sensor may be replaced at the time of a subsequent service call.

It is, however, particularly advantageous if a drift-compensated structure-borne noise signal is obtained on the basis of the ascertained drift and the detected structure-borne noise signal. The service life of the structure-borne noise sensor is thus considerably extended, which reduces the operating costs of the engine. At the same time, the quality of the information provided by the structure-borne noise sensor is improved, which makes better control or regulation of the combustion process in the combustion chambers possible. Finally, emissions and fuel consumption are favorably affected.

A core of the method according to the present invention is that a reference signal, i.e., a reference quantity based thereon, is detected or ascertained, preferably in a certain reference state, in a "new" structure-borne noise sensor, which does not yet have any drift. This may take place either on the specific engine on which the structure-borne noise sensor is to be subsequently installed, or on a reference engine. The maximum amplitude of the low-frequency structure-borne noise signal may be used, for example, as a reference quantity that is easy to determine. An initial state of the structure-borne noise sensor is thus defined.

Since the reference operating state may also be brought about in normal operation of the engine and the selected reference quantity may also be ascertained in normal operation of the engine, a change in the ascertained quantity with respect to the reference quantity may be determined in a simple way during the subsequent operation of the engine. This change directly corresponds to the drift of the structure-borne noise sensor when the maximum signal amplitude is used as the reference quantity. No additional sensors are needed for carrying out this method. Therefore, there are no installation costs.

The reliability in using the method according to the present invention may be enhanced by a plausibility check. At least one second sensor is needed therefor, whose signal is related to the same combustion chamber as that of the first sensor. If the ascertained quantity for the combustion chamber differs from the reference quantity only for the first sensor, but not for the second sensor, this is a clear indication of a drift of the first sensor.

The plausibility check may also be performed after carrying out drift compensation of the structure-borne noise signal of both sensors. For this purpose, a first ratio of the two reference quantities of the two sensors is initially formed for a certain combustion chamber, after which a second ratio is formed from the drift-compensated structure-borne noise signals of both sensors. In the case of an ideal drift compensation, the difference between the two ratios is equal to zero. The quality of the drift compensation performed may be inferred by ascertaining the difference between the two ratios.

The meaningfulness of the drift determination is further enhanced by ascertaining the reference quantity for different reference operating states and forming a reference characteristic curve therefrom. Furthermore, it is then not necessary to rely on a certain reference operating state for ascertaining the drift, so that the drift compensation may be performed more often during operation of the engine.

The drift compensation method according to the present invention is accurate in particular when no fuel is injected in the reference operating state, i.e., the engine is in overrun operation. The low-frequency signal component thus generated is only slightly affected by noise.

The use of the drift-compensated structure-borne noise signal offers special advantages for cylinder diagnosis. In this case it is important in particular that a drift of the structure-borne noise sensor may be ruled out as the cause for an unusual signal. In regular operation, inadmissible compression losses in a combustion chamber, as well as a defective injector, may be recognized using such a cylinder diagnosis.

DETAILED DESCRIPTION

Figure 1:
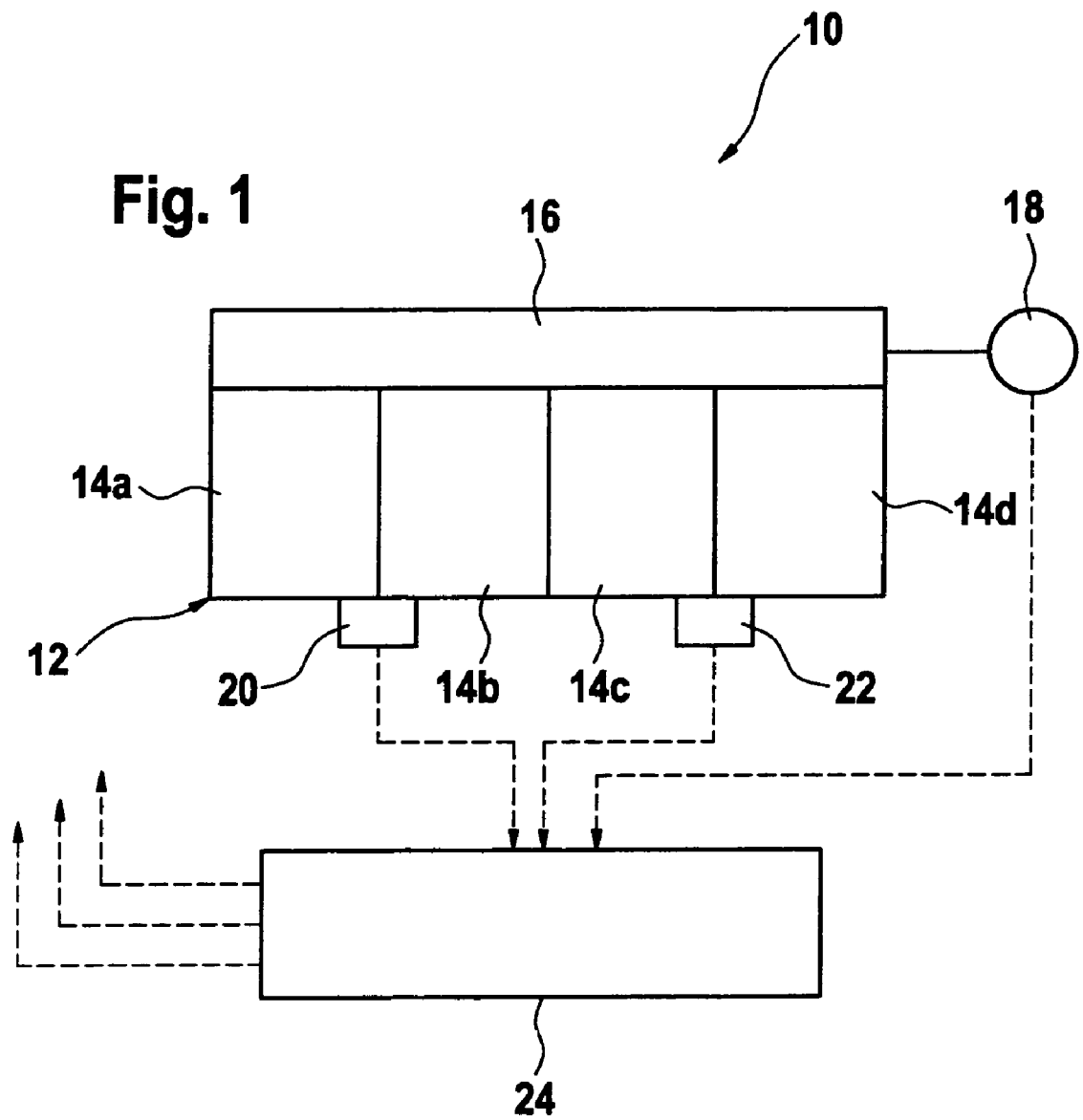
FIG. 1 shows a schematic depiction of an internal combustion engine having a first structure-borne noise sensor and a second structure-borne noise sensor.

An internal combustion engine is labeled overall with reference numeral 10 in FIG. 1. It is used for the propulsion of a motor vehicle, not depicted in FIG. 1, and operates by the diesel principle. There are four in-line combustion chambers 14a, 14b, 14c, and 14d in an engine block 12. As is known, a crankshaft 16 is set into rotation when engine 10 is operated, and its rotational speed and angular position are detected by a sensor 18.

A first structure-borne noise sensor 20 is situated on engine block 12 in the middle between combustion chambers 14a and 14b. A second structure-borne noise sensor 22 is situated on engine block 12 in the middle between combustion chambers 14c and 14d. The signals of sensors 18, 20, and 22 are supplied to a control and/or regulating unit 24, which controls and/or regulates the operation of engine 10.

Figure 2:
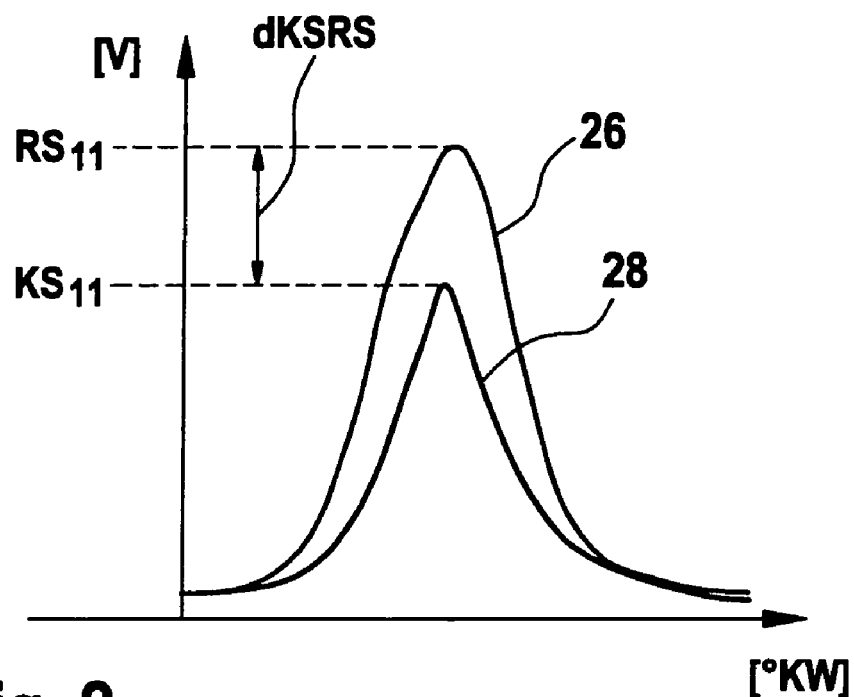
FIG. 2 shows a diagram in which a reference signal and the signal, ascertained in operation, of the first structure-borne noise sensor of FIG. 1 are plotted against the angle of a crankshaft for a first combustion chamber.
Figure 3:
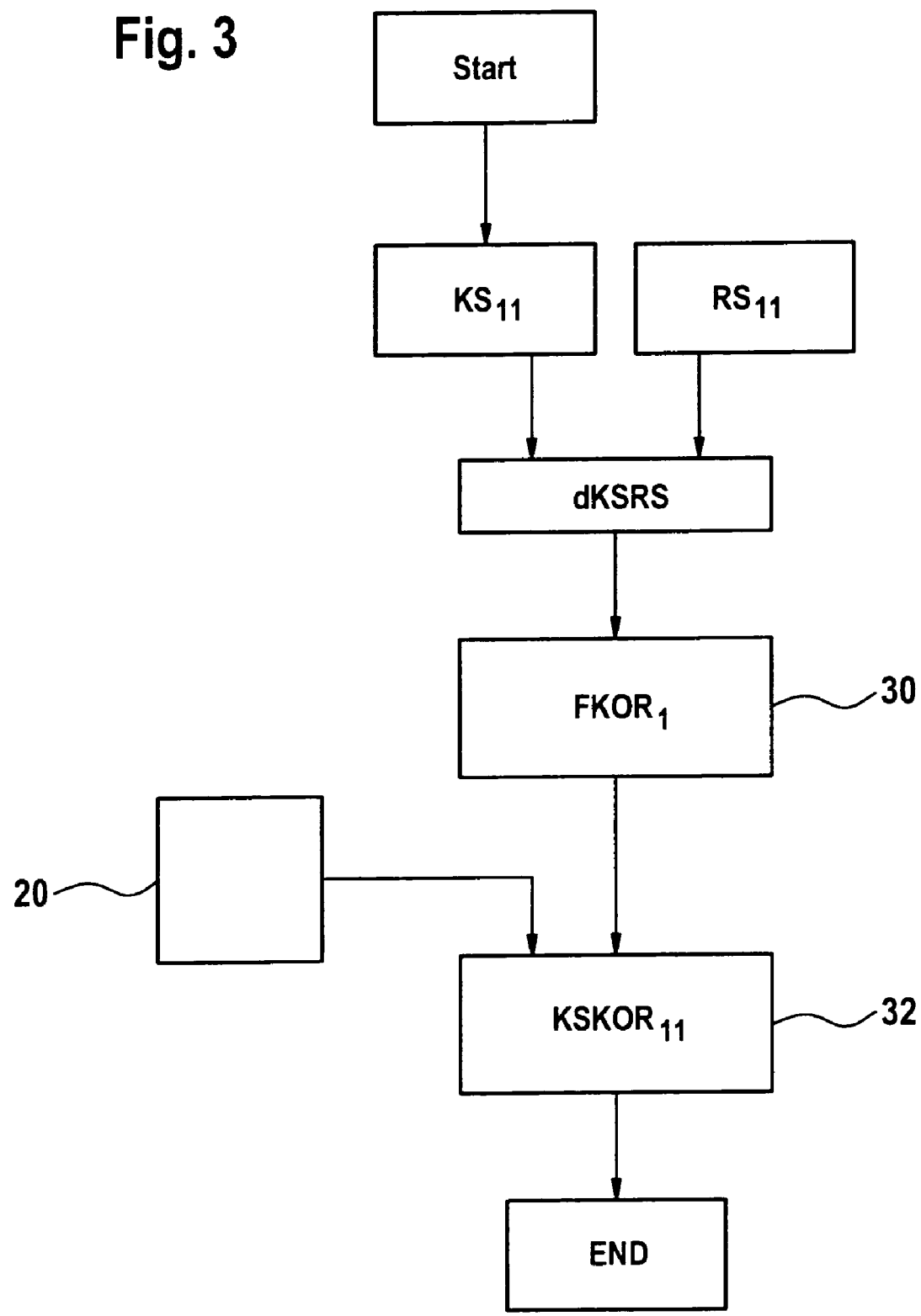
FIG. 3 shows a flow chart of a method for drift compensation of the first structure-borne noise sensor.

In order to recognize, quantify, and compensate a drift of the signal of first structure-borne noise sensor 20, for example, a procedure is followed which is to be elucidated with reference to FIGS. 2 and 3. This procedure and the procedures to be described below are stored in a memory of control and regulating unit 24 as a computer program.

Initially, the signal of first structure-borne noise sensor 20 is detected immediately after the manufacture of engine 10. For this purpose, engine 10 is operated in a reference operating state, for example, in a state in which no fuel is injected into combustion chambers 14 (overrun operation). The compression in combustion chambers 14 causes a deformation in engine block 12, which is detected in the form of a low-frequency signal component of the signal provided by first structure-borne noise sensor 20.

For combustion chamber 14b, to be referred to hereinafter as first combustion chamber, a low-frequency signal is generated in this combustion chamber 14b during the compression phase as shown by curve 26 in FIG. 2. The maximum amplitude is designated as reference quantity and has the value $RS_{11}$. The first index shows that this reference quantity is caused by a compression in first combustion chamber 14b, while the second index shows that the reference quantity is based on the signal of first structure-borne noise sensor 20.

To ascertain the reference quantity, a special reference engine may also be used, which is similar or even identical to the actually operated engine. Furthermore, it is possible to ascertain reference quantity RS and form a reference characteristic curve therefrom for different reference operating states, i.e., not only in overrun operation.

In the subsequent operation of engine 10, after a certain time of operation, for example, after 100 hours of operation, engine 10 is brought to the same reference operating state again, i.e., in this case, into overrun operation. It is also possible to simply perform the procedure described below when engine 10 is in this reference operating state, i.e., overrun operation, anyway. In this reference operating state, the signal of first structure-borne noise sensor 20 is recorded again for a compression cycle in first combustion chamber 14b, which results in curve 28 in FIG. 2, whose maximum amplitude has the value $KS_{11}$ which is considerably less than reference quantity $RS_{11}$.

The difference dKSRR between reference quantity $RS_{11}$ and the actual quantity $KS_{11}$ ascertained by the same sensor 20 for the same combustion chamber 14b in the same reference operating state is interpreted as drift of first structure-borne noise sensor 20.

As is apparent from FIG. 3, a correction factor $FKOR_1$ is formed from this recognized drift in a method step 30. This correction factor is multiplied by the actual signal 28 of first structure-borne noise sensor 20 and provides a drift-compensated signal $KSKOR_{11}$ in a method step 32. In the ideal case, in the reference operating state for first combustion chamber 14b, this drift-compensated actual signal $KSKOR_{11}$ is identical to reference curve 26 immediately after drift compensation.

Figure 4:
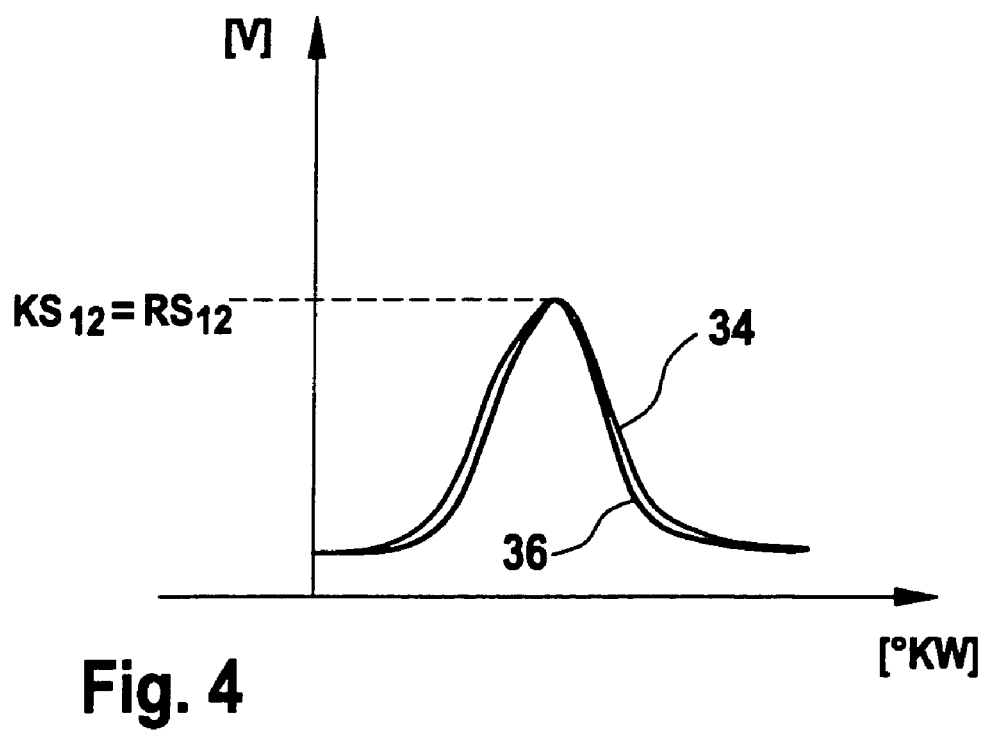
FIG. 4 shows a diagram similar to FIG. 2 for a second structure-borne noise sensor and the first combustion chamber.

Whether the difference dKSRS between reference quantity $RS_{11}$ and actual quantity $KS_{11}$ corresponds to a drift may be decided in this case via a plausibility check using the signal of second structure-borne noise sensor 22. Also for this structure-borne noise sensor 22, the corresponding structure-borne noise signal is recorded for a compression cycle in combustion chamber 14b immediately after the manufacture of engine 10, when second structure-borne noise sensor 22 has certainly no drift yet. In FIG. 4, this signal is labeled 34. Its maximum amplitude has the value $RS_{12}$ and is less than maximum amplitude $RS_{11}$ of first structure-borne noise sensor 20, which is understandable because of the greater distance of second structure-borne noise sensor 22 from combustion chamber 14b.

At the same time when the drift compensation described in connection with FIGS. 2 and 3 is performed, a signal from second structure-borne noise sensor 22, which is generated by a compression cycle in combustion chamber 14b in the same reference operating state, is also recorded. This signal is labeled 36 in FIG. 4. The corresponding maximum amplitude is labeled $KS_{12}$. It is apparent that the two signals 34 and 36 and the two maximum amplitudes $RS_{12}$ and $KS_{12}$ are essentially identical. This means that the compression in combustion chamber 14b has not changed with respect to the reference operating state, and therefore the difference established in FIG. 2 between the values $RS_{11}$ and $KS_{11}$ must be attributed to a drift. In contrast, the state of affairs in FIG. 4 indicates that second structure-borne noise sensor 22 is not (yet) subject to drift.

Figure 5:
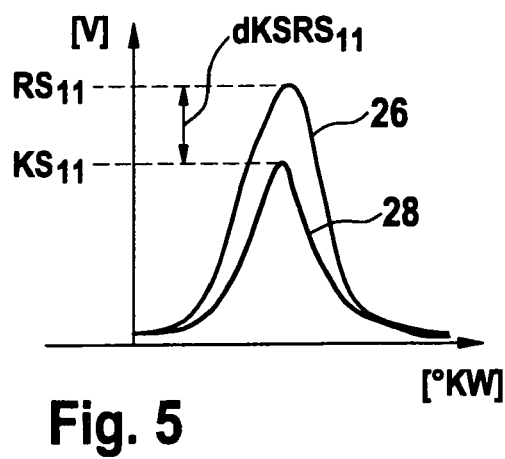
FIG. 5 shows a diagram identical to that of FIG. 2 for elucidating a plausibility check.
Figure 6:
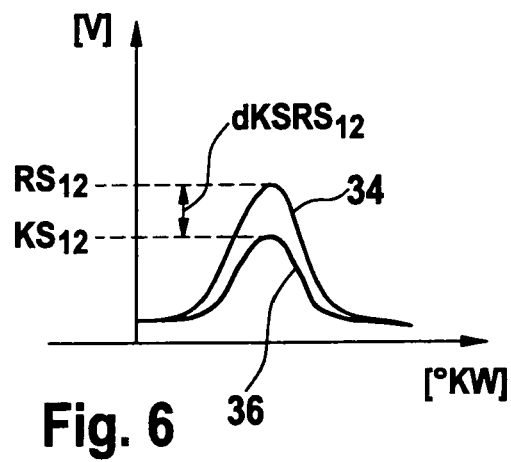
FIG. 6 shows a diagram similar to FIG. 5 for the second sensor and the first combustion chamber.
Figure 7:
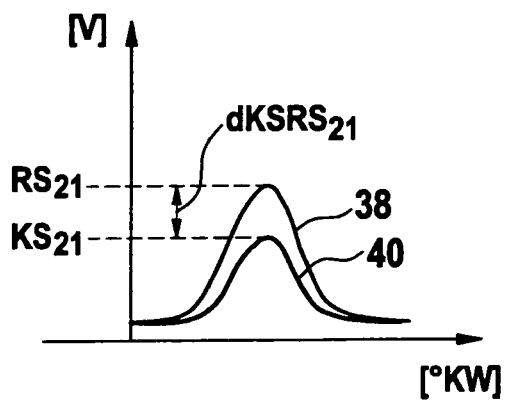
FIG. 7 shows a diagram similar to FIG. 5 for the first sensor and a second combustion chamber.

A somewhat more complex plausibility check is now elucidated with reference to FIGS. 5 through 9. For the sake of simplicity, the same reference numerals as above are used for the functionally equivalent states of affairs. The diagram of FIG. 5 is identical to the diagram of FIG. 2. The diagram of FIG. 6 is similar to the diagram of FIG. 4; however, in the present exemplary embodiment, second structure-borne noise sensor 22 is also subject to a drift, which is manifested in a difference $dKSRS_{12}$ between reference quantity $RS_{12}$ and the actually ascertained quantity $KS_{12}$. The diagram of FIG. 7 shows a reference curve 38, as obtained by first structure-borne noise sensor 20 in overrun operation immediately after the manufacture of engine 10 during a compression in combustion chamber 14c, which is also designated as second combustion chamber. Curve 40 shown in FIG. 7 corresponds to a signal detected by first structure-borne noise sensor 20 at a later point in time in the same reference operating state, also during a compression cycle in second combustion chamber 14c. Also in this case, the drift of first structure-borne noise sensor 20 is recognizable from the difference $dKSRS_{21}$ between the reference quantity $RS_{21}$ and the actually ascertained quantity $KS_{21}$.

Figure 8:
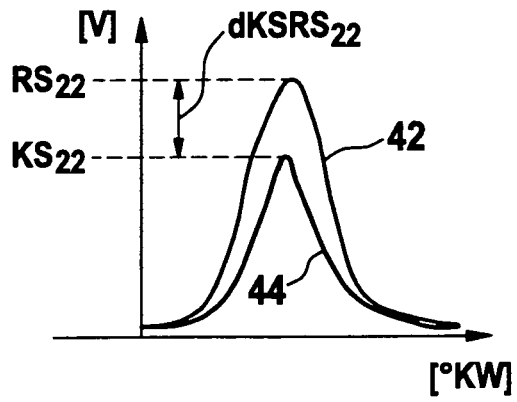
FIG. 8 shows a diagram similar to FIG. 5 for the second sensor and the second combustion chamber.

Similarly, signal 42 of second structure-borne noise sensor 22, delivered by the sensor in overrun operation immediately after the manufacture of engine 10 during a compression cycle in second combustion chamber 14c, is plotted in FIG. 8. The curve detected by second structure-borne noise sensor 22 at a later point in time also in overrun operation during a compression cycle in second combustion chamber 14c is labeled 44. Also in this case, the drift of second structure-borne noise sensor 22, already indicated in FIG. 6, is manifested in difference $dKSRS_{22}$ between reference quantity $RS_{22}$ and actual quantity $KS_{22}$.

Figure 9:
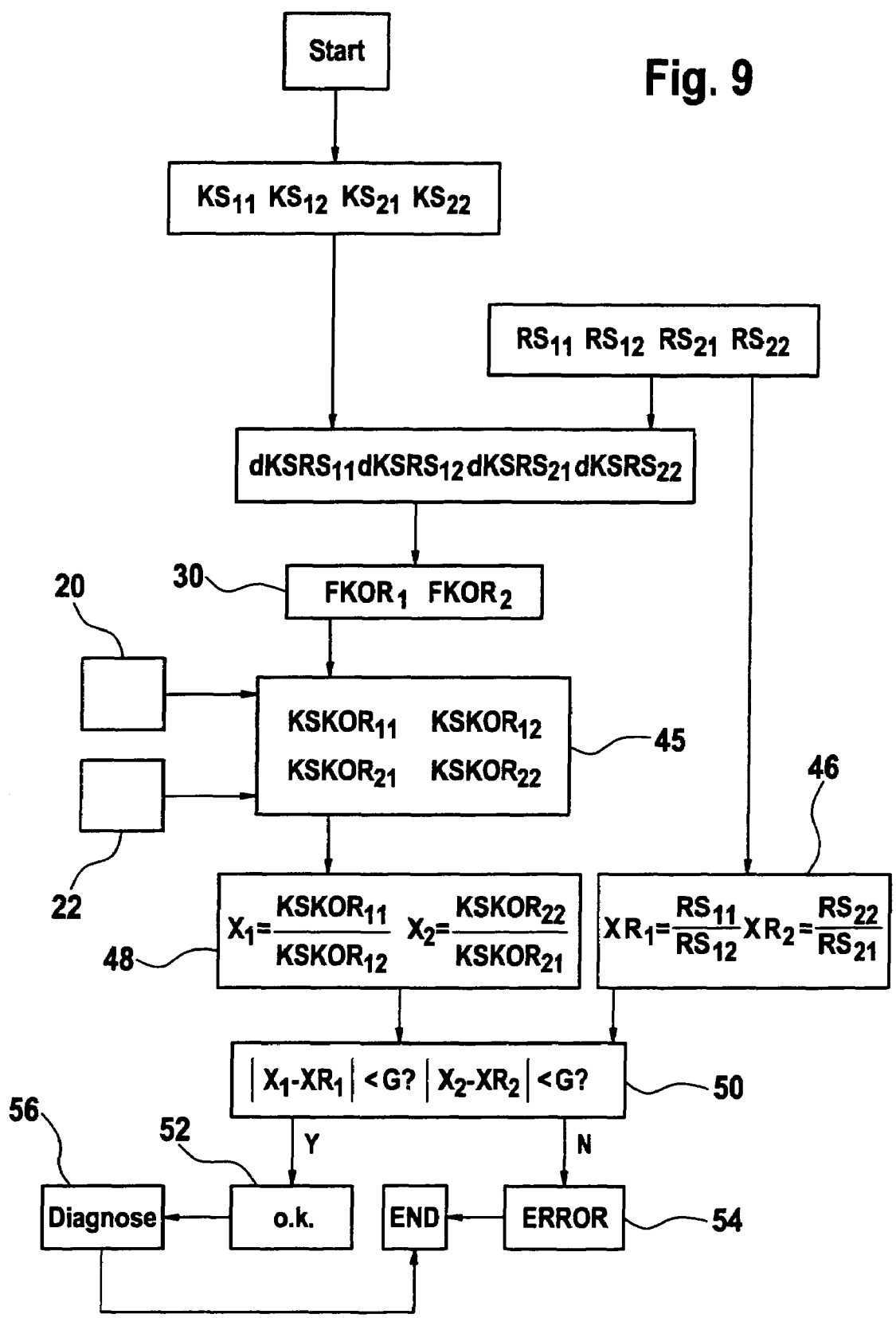
FIG. 9 shows a flow chart for elucidating the plausibility check procedure of FIGS. 5 through 8.

Similarly to the procedure shown in FIG. 3, according to the diagram shown in FIG. 9, a correction factor $FKOR_1$ is ascertained in a method step 30 for first structure-borne noise sensor 20, for example, as a mean value of drifts $dKSRS_{11}$ and $dKSRS_{21}$ resulting from FIGS. 5 and 7, respectively. Also in method step 30, a correction factor $FKOR_2$ is ascertained for second structure-borne noise sensor 22, and a mean value is ascertained from drifts $dKSRS_{12}$ and $dKSRS_{22}$ resulting from diagrams 6 and 8. Drift-compensated signals $KSKOR_{11}$, $KSKOR_{12}$, $KSKOR_{21}$, and $KSKOR_{22}$ are calculated using correction factors $FKOR_1$ and $FKOR_2$ and the actual signals provided by structure-borne noise sensors 20 and 22 (step 45 in FIG. 9).

The drift compensation using factors $FKOR_1$ and $FKOR_2$ may be in turn subjected to a plausibility check. For this purpose, a first ratio $XR_1$ is formed in any desired operating states of the combustion chambers for first combustion chamber 14b from the two reference quantities $RS_{11}$ and $RS_{12}$ of the two structure-borne noise sensors 21 and 22. Similarly, a second ratio $XR_2$ is formed for second combustion chamber 14c (method step 46 in FIG. 9). In addition, in a method step 48, ratio $X_1$ is formed for first combustion chamber 14b from drift-compensated quantities $KSKOR_{11}$ and $KSKOR_{12}$ of the two structure-borne noise sensors 21 and 22. Similarly, a second ratio $X_2$ is formed for second combustion chamber 14c.

In a method step 50 a check is performed of whether the difference between first ratio $XR_1$ and second ratio $X_1$ (for first combustion chamber 14b) and the difference between first ratio $XR_2$ and second ratio $X_2$ (for second combustion chamber 14c) are less than a limiting value G. If this is the case, the drift compensation has yielded a satisfactory result (method step 52). Otherwise an error message is output in a method step 54.

Using the drift-compensated signals, a reliable diagnosis of the compression state and/or combustion state in combustion chambers 14a through 14d may be performed in a method step 56. For example, if it is established that the two structure-borne noise sensors 20 and 22 for combustion chamber 14a exhibit a difference between the reference quantity and the actually detected quantity, this is to be considered an indication of an actual compression loss or of a malfunction of an injector associated with this combustion chamber 14a.

The same is true for the case where, although the plausibility check in method steps 46 through 50 shows a successful drift compensation for the overrun operation, but in combustion operation, in which fuel is injected into combustion chamber 14b, a difference is found between a corresponding reference signal and the actual quantity detected at that time for the same combustion chamber, for example, combustion chamber 14b. Such a combustion operating state may be, for example, idling of engine 10, in which relatively steady-state conditions prevail.

It is understood that the corresponding reference quantities are stored in a memory of control and regulating unit 24. These may also be stored in the form of characteristic curves and for different reference operating states of engine 10.

What is claimed is:

1. A method for operating an internal combustion engine comprising:
   detecting a structure-borne noise generated by a pressure change in a combustion chamber by at least one structure-borne noise sensor;
   ascertaining a quantity as a function of the structure-borne noise signal, using an undrifted structure-borne noise sensor, wherein during continuous operation of the engine the quantity is ascertained by the at least one structure-borne noise sensor; and
   ascertaining a drift of the structure-borne noise sensor from a change over time of the quantity ascertained during continuous operation, with respect to a reference quantity.

2. The method according to claim 1, further comprising:
   ascertaining the reference quantity for different reference operating states; and
   forming a reference characteristic curve from them.

3. The method according to claim 1, further comprising ascertaining quantities in a reference operating state in which no fuel is injected.

4. The method according to claim 1, further comprising obtaining a drift-compensated structure-borne noise signal on the basis of the ascertained drift and the detected structure-borne noise signal.

5. The method according to claim 4, further comprising performing a cylinder diagnosis during engine operation, using the drift-compensated structure-borne noise signal.

6. The method according to claim 1, further comprising plausibility-checking a detected drift using a signal of at least one second sensor, specific to a same combustion chamber.

7. The method according to claim 6, further comprising:
   forming a first ratio from reference quantities of the two sensors for the same combustion chamber;
   forming a second ratio from drift-compensated structure-borne noise signals of the two sensors for the same combustion chamber; and
   for checking the drift compensation, comparing a difference between the first ratio and the second ratio to at least one limiting value.

8. The method according to claim 1, further comprising ascertaining the reference quantity on a reference engine.

9. The method according to claim 8, wherein the reference quantity is a maximum amplitude.

10. A computer-readable medium containing a computer program which, when executed by a processor, performs the following steps for operating an internal combustion engine:
    detecting a structure-borne noise generated by a pressure change in a combustion chamber by at least one structure-borne noise sensor;
    ascertaining a quantity as a function of the structure-borne noise signal, using an undrifted structure-borne noise sensor, wherein during continuous operation of the engine the quantity is ascertained by the at least one structure-borne noise sensor; and
    ascertaining a drift of the structure-borne noise sensor from a change over time of the quantity ascertained during continuous operation, with respect to a reference quantity.

11. A control/regulating unit for an internal combustion engine, comprising:
- means for detecting a structure-borne noise generated by a pressure change in a combustion chamber by at least one structure-borne noise sensor;
- means for ascertaining a quantity as a function of the structure-borne noise signal, using an undrifted structure-borne noise sensor, wherein during continuous operation of the engine the quantity is ascertained by the at least one structure-borne noise sensor; and
- means for ascertaining a drift of the structure-borne noise sensor from a change over time of the quantity ascertained during continuous operation, with respect to a reference quantity.

* * * * *